United States Patent

Rosenweig et al.

[15] 3,648,269
[45] Mar. 7, 1972

[54] MAGNETIC FLUID DISPLAY DEVICE

[72] Inventors: Ronald E. Rosenweig, Lexington, Mass.; Joseph Resnick, deceased, late of New York, N.Y.; Louis Berger, executor; Harry Resnick, executor; Peter Messina, executor, all of Ellenville, N.Y.

[73] Assignee: Ferrofluidics Corporation, Burlington, Mass.

[22] Filed: July 16, 1970

[21] Appl. No.: 55,392

[52] U.S. Cl. .........................340/373, 340/324 R, 350/267, 350/319
[51] Int. Cl. ..........................................G08b 5/22
[58] Field of Search..............340/324 R, 373; 350/151, 160, 350/267, 319

[56] References Cited

UNITED STATES PATENTS

| | | | |
|---|---|---|---|
| 1,835,612 | 12/1931 | Pearson | 350/267 |
| 1,963,496 | 6/1934 | Land | 350/267 X |
| 2,891,242 | 6/1959 | Lukoff | 340/373 |
| 3,229,281 | 1/1966 | Hackenfort | 340/373 |
| 3,292,171 | 12/1966 | Wilson | 340/324 R |
| 3,322,482 | 5/1967 | Harmon | 350/267 |
| 3,328,110 | 6/1967 | Berger et al | 350/151 X |
| 3,560,956 | 2/1971 | Sinnott | 340/324 R |
| 3,572,896 | 3/1971 | Bertram | 350/267 |

*Primary Examiner*—David L. Trafton
*Attorney*—Richard P. Crowley and Richard L. Stevens

[57] ABSTRACT

An immiscible, transparent fluid and an opaque magnetic fluid are contained within a defined volume, such as a sandwich-type construction having a transparent face through which an optical display may be observed. The transparent fluid preferentially wets the wall and results in complete displacement of opaque fluid when the fluids are moved one to the other. A magnetic field captures the magnetic fluid in a predetermined optical pattern. The optical pattern is controlled by varying the intensity and location of the magnetic field to produce various patterns.

21 Claims, 13 Drawing Figures

Patented March 7, 1972  3,648,269

INVENTOR

BY *Crowley & Stevens*

ATTORNEY

MAGNETIC FLUID DISPLAY DEVICE

SUMMARY OF THE INVENTION

This invention relates to optical displays in which optical patterns may be controlled by varying a magnetic field which acts upon a quantity of an opaque magnetic fluid. The magnetic fluid may be used to form patterns or alternatively to unveil graphic symbols imprinted on a surface. The invention performs a function which permits changes in shape, position, and state of subdivision of an opaque curtain, for example into separate pools or droplets. Subsequently, the curtain may be combined again into a single coherent area. In other words, the invention produces a change of shape or a reversible subdivision of a fluid with a degree of control not heretofore possible. Further the invention utilizes the phenomenon of preferential wetting of a surface by an appropriate nonmagnetic fluid. Briefly, the invention comprises a combination of a magnetic fluid and an immiscible nonmagnetic fluid one of the fluids being of one color and the other of a clearly distinguishable color or the magnetic fluid being opaque while the immiscible carrier fluid is relatively transparent. The fluids are contained within a defined volume such as within a sandwich-type construction. One of the faces of such construction is transparent whereby the various patterns formed by the magnetic fluid within the construction may be readily viewed.

BRIEF DESCRIPTION OF THE DRAWINGS

FIG. 2b is a sectional view of an alternative embodiment of FIG. 2a;

FIG. 6 is a sectional view of FIG. 5a.

DESCRIPTION OF THE PREFERRED EMBODIMENT

Figure 1:
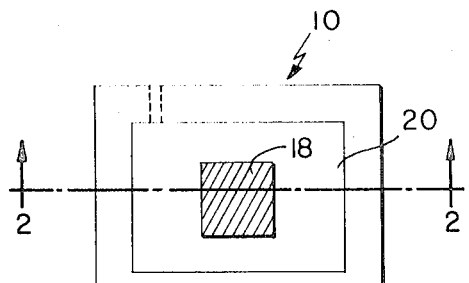
FIG. 1 is a plan front view of one embodiment of the invention.
Figure 2A:
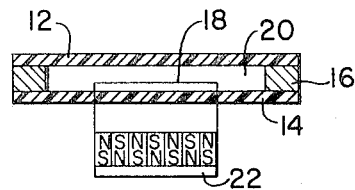
FIG. 2a is a schematic sectional view of FIG. 1 taken along lines 2—2 of FIG. 1.
Figure 2B:
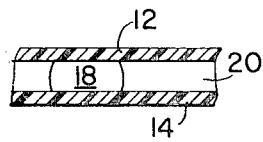

Referring to FIGS. 1 and 2, the invention is shown generally at 10 and comprises an upper transparent surface 12 spaced apart from a lower surface 14 by a rectangular-shaped spacer 16. Disposed within the space defined by the surfaces 12 and 14 and spacer 16 is a magnetic fluid 18 and a transparent, immiscible fluid 20. Spaced apart from the surface 14 is a magnetic array 22 which is specially designed for compactness and to create short-range magnetic fields with large field gradients. If desired the magnetic array may be disposed within one of the surfaces. The magnetic array captures a thin fluid layer of relatively uniform thickness in any desired area. As shown in FIG. 2a, the magnetic fluid does not extend from one to the other surface. However, if desired, it may extend from one to the other surface as shown in FIG. 2b.

Figure 3:
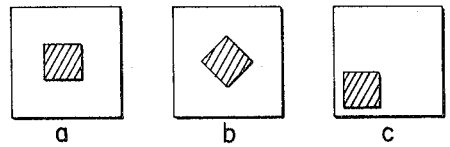
FIGS. 3a through f are schematic illustrations of various displays which may be achieved with the invention.
Figure 4:
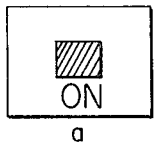
FIG. 4 is a schematic illustration of the invention demonstrating its use to reveal graphic messages or designs on a particular surface.

In FIG. 3a the pattern of the magnetic fluid reveals the size and configuration of the underlying magnetic field. In FIG. 3b the magnetic field and hence the pattern established by the magnetic fluid has been rotated by 45°. FIG. 3c depicts the translation of the pattern when the magnetic field is moved. The pattern as shown in FIG. 3d results in a distribution of drops when the magnet is oscillated rapidly or if the frame is vibrated vigorously. FIG. 3e shows the fluid falling under the force of gravity when the magnetic field is removed and FIG. 3f is the equilibrium of the fluids in the presence of gravity alone. By imprinting a graphic message or design on the surface 14 and providing the magnetic fluid on one side of the surface as shown and the magnetic source on the other the unique arrangement of veiling and unveiling the imprinted message of design is achieved simply by varying the position of orientation and characteristics of the magnetic sources achieved. As shown in FIG. 4, this arrangement could be used to indicate the presence or absence of a particular electrical current. For example, the magnet behind the surface could be an electromagnet and when the circuit has been actuated or is live then the magnetic fluid would be positioned as shown revealing the letters "on" indicating the flow of current through a particular circuit. When the current through the circuit is discontinued, then the magnetic fluid would fall by gravity to the position indicated in FIG. 3c to reveal the work "off" indicating that no current is passing through the circuit. Alternatively, the fluid can be located by a permanent magnetic field, moved by an electromagnetic field and returned by the permanent magnetic field with no additional consumption of power.

The magnet may be positioned by hand, by a motorized drive, by a float, by an acoustical transducer or any other means of displacement. A magnetic imprint on a moving tape may be used to display messages that move across the display unit. Various colored and reflecting backgrounds enhance the graphic displays. The graphics may be combined on the front or back surface of both plates and the displays may be used in flat, cylindrical, spherical or other geometries. By using electromagnets and/or the fields surrounding current carrying wires, the pattern may be controlled either by motion of the magnetic field source or by switching the currents or a combination of the two. Alphanumeric displays may also be created.

Figure 5:
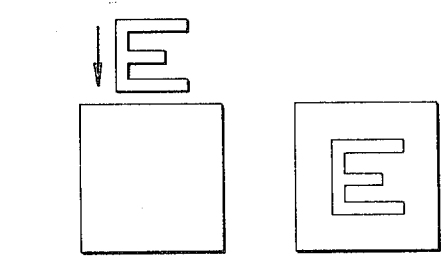
FIGS. 5a and b are schematic illustrations of the invention wherein a permeable shield is used to vary the display pattern rather than varying the magnetic field.
Figure 6:
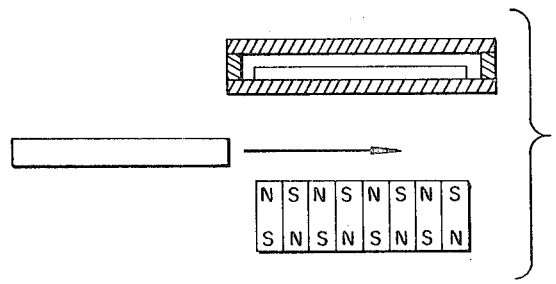

FIG. 5 shows the effect when a permeable sheet of any shape, but as shown in the shape of the letter E, is inserted between the magnet and magnetic fluid and is effective in shielding the applied field locally. As shown, FIG. 5a shows the pattern established by the magnet and magnetic fluid before the insertion of the permeable shield and FIG. 5b illustrates the resulting pattern when the permeable shield has been positioned. Also with the permeable shield, other patterns may be obtained by rotation or translation of the permeable shield rather than the magnet field source.

The material used in the invention, that is the magnetic and nonmagnetic fluids and the substrate wall, should possess the desired properties of preferential wetting. Any type of magnetic fluid may be used with the invention and this would include those magnetic fluids which comprise a carrier fluidlike water, hydrocarbons, fluorocarbons, etc., a surface active agent such as fatty acids, for example a mono-unsaturated fatty acidlike oleic acid, and any other type particles such as ferrous materials like ferrite, chromium dioxide, magnetite etc. The immiscible fluid used with the magnetic fluid should first be immiscible with the magnetic fluid, must preferentially wet the substrate, and further in most cases it is desired that it have a density which approaches that of the magnetic fluid for easier positioning of the fluid when the magnetic fluid is moving in relation to the immiscible fluid by the application of various magnetic fields. Useful immiscible fluids which may be used with waterbase magnetic fluids are silicone fluids, hydrocarbon materials such as mineral oil, carbon tetrachloride, combinations of the same and other similar materials for a wall that is composed of glass or polystyrene.

Although the invention has been described in general with reference to the magnetic fluid being opaque and the immiscible fluid being transparent, the magnetic fluid if desired may be transparent and the immiscible fluid opaque. Useful combinations of magnetic fluids, immiscible fluids and surface substrates which may be used are: a water-base ferrofluid, mineral oil, and glass; a water-base ferrofluid, mineral oil, and polystyrene; a water-base ferrofluid, silicone, and glass; a water-base ferrofluid, silicone, and polystyrene; a kerosene-base ferrofluid, water with a water soluble surfactant agent such as sodium lauryl sulfate, and glass; and a fluorocarbon-base ferrofluid, water and a water soluble surfactant agent, and glass.

Having described the invention, what we now claim is:
1. A magnetic fluid display device which comprises:
   a. a magnetic fluid;

b. an immiscible fluid in combination therewith;

c. means to retain the magnetic fluid and the immiscible fluid within a predetermined volume, said means including a surface adapted to be preferentially wetted by the immiscible fluid; and d. magnet means to control the movement of the magnetic fluid through the application of a magnetic field whereby a predetermined optical pattern is established.

2. The device of claim 1 wherein the means to retain the fluids includes first and second surface means, a portion of one of said surfaces being transparent, spacer means disposed between said surfaces and defining in combination with said surfaces the predetermined volume.

3. The device of claim 1 wherein the magnet means is spaced apart from the means to retain the fluids.

4. The device of claim 1 wherein the magnetic fluid is opaque and the immiscible fluid is transparent, the means to retain the fluids includes a first transparent plate and a second plate in spaced apart relationship, the second plate having a patterned surface thereon adapted to be viewed through the transparent plate whereby through movement of the magnet means the magnetic field may be caused to mask and unmask the pattern.

5. The device of claim 1 wherein the fluids are of distinct colorations.

6. The device of claim 5 wherein the magnetic fluid is opaque and the immiscible fluid is transparent.

7. The device of claim 1 which includes means to interpose a barrier between magnet means and the magnetic fluid whereby the pattern established by the magnetic field is varied.

8. A method for displaying visual patterns which comprises:

a. providing a device containing therein a magnetic fluid and an immiscible fluid and having a surface adapted to be wetted preferentially by an immiscible fluid;

b. creating a magnetic field;

c. capturing the magnetic fluid in the magnetic field to provide a predetermined optical pattern; and d. varying the magnetic field to provide various optical patterns.

9. The method of claim 8 wherein the magnetic fluid is opaque and the immiscible fluid is transparent.

10. The method of claim 8 which includes magnet means to create the magnetic field.

11. The method of claim 8 which includes rotating the magnetic field source to provide the varied optical pattern.

12. The method of claim 8 which includes interposing within the magnetic field magnetically permeable barrier means to vary the optical pattern.

13. The method of claim 8 which includes providing a first surface having a pattern thereon, providing a second surface spaced apart from the first surface said second surface being transparent whereby varying the magnetic field as to intensity and position the visual pattern observed is also varied.

14. The method of claim 13 wherein one surface of the nontransparent surface has a predetermined visual pattern thereon and which includes varying the location of the opaque magnetic fluid within the predetermined volume to mask and unmask the pattern whereby it may be readily observed.

15. The method of claim 8 wherein the magnetic fluid is a water-base magnetic fluid, the immiscible fluid is a mineral oil and the surface is glass.

16. The method of claim 8 wherein the magnetic fluid is a water-base magnetic fluid, the immiscible fluid is a hydrocarbon oil and the surface is polystyrene.

17. The method of claim 8 wherein the magnetic fluid is a water-base magnetic fluid, the immiscible fluid is silicone and the surface is glass.

18. The method of claim 8 wherein the magnetic fluid is a water-base magnetic fluid, the immiscible fluid is silicone and the surface is polystyrene.

19. The method of claim 8 wherein the magnetic fluid is a kerosene-base magnetic fluid, the immiscible fluid is water in combination with a surfactant agent and the surface is glass.

20. The method of claim 19 wherein the surfactant agent is sodium lauryl sulfate.

21. The method of claim 8 wherein the magnetic fluid is a fluorocarbon-base magnetic fluid, the immiscible fluid is water in combination with a surfactant agent and the surface is glass.

* * * * *